United States Patent [19]

Hara et al.

[11] 4,134,529

[45] Jan. 16, 1979

[54] METHOD OF JOINING COATED LARGE-DIAMETER STEEL PIPES LAID UNDERGROUND

[75] Inventors: Atsushi Hara, Tokyo; Tatsuaki Takeuchi; Jun-ichi Ogata, both of Yokohama, all of Japan

[73] Assignee: Nippon Kokan Kabushiki Kaisha, Tokyo, Japan

[21] Appl. No.: 779,601

[22] Filed: Mar. 21, 1977

[51] Int. Cl.$^2$ .............................................. B21D 39/04
[52] U.S. Cl. ...................................... 228/175; 156/158; 156/281; 156/294; 156/321; 228/176; 228/214
[58] Field of Search ............... 228/175, 176, 214, 216; 156/158, 281, 294, 321; 29/401 R, 401 C, 401 D

[56] References Cited

U.S. PATENT DOCUMENTS

| | | | |
|---|---|---|---|
| 2,786,264 | 3/1957 | Colombo | 156/158 X |
| 3,286,341 | 11/1966 | Miller | 228/175 |
| 3,289,293 | 12/1966 | Stenquist et al. | 228/214 X |
| 3,541,670 | 11/1970 | McCrory | 228/176 |
| 3,817,805 | 6/1974 | Surikov et al. | 228/176 X |

Primary Examiner—Al Lawrence Smith
Assistant Examiner—K. J. Ramsey
Attorney, Agent, or Firm—Haseltine, Lake & Waters

[57] ABSTRACT

A method of joining coated large-diameter steel pipes laid underground which comprises placing the steel pipes end to end, applying a layer of heat insulating material to the outer surface of the welding part, covering the ends of the pipe coating, the non-coated part of the pipe ends and the layer of the heat insulating material with a layer of a heat fusible, heat adhesive, corrosion resisting material of a shape corresponding to the external shape of the pipes, placing a thin clamp plate around the outer surface of this layer to make it fast, and then internally welding the groove to join the pipes together, whereby the welding heat is utilized effectively and both the corrosion resisting material and the pipe coating are fused by the heat, thus causing the thermally fused corrosion resisting material to adhere and solidify on the uncoated portions of the pipes and unite with the ends of the pipe coating and thereby forming a corrosion resisting covering layer. In addition, in the laying of steel pipes there is no need to dig a special excavation of an especially large cross-sectional area around the joint, and upon completion of the assemblying of the above-mentioned various joining materials the excavation around the joining part can be backfilled prior to the welding of the joining part of the pipes, thus ensuring speedy laying of steel pipes in the ground, particularly a reduction in the time required from the beginning of laying up to the backfilling of excavation.

10 Claims, 7 Drawing Figures

METHOD OF JOINING COATED LARGE-DIAMETER STEEL PIPES LAID UNDERGROUND

BACKGROUND OF THE INVENTION

The present invention relates to a method of joining steel pipes during the laying of coated large-diameter steel pipes underground.

Generally, the laying of coated large-diameter steel pipes in the ground is accomplished by digging the required excavation and setting steel pipes in the excavation, digging a cavity of a large section around the joining part of the pipes, aligning the pipes in the excavation, performing a tack welding, accomplishing a regular welding on both the inside and outside of the pipes, subjecting the joined part and the adjacent portions to cleaning and anticorrosion treatments and then backfilling the excavations. The problem with this method is that a considerable time is required before the completion of all of such operations, and that while it is possible to backfill a large part of the excavation during the relatively early period of the laying, the special excavation around the joining part of the pipes must be left without backfilling for a considerably long period of time. In the traffic laden areas such as city areas, however, efforts have been required to minimize the time required from the digging of excavations until the backfilling thereof.

It is known in the art to internally weld the pipes in order to ensure speedy joining of large-diameter steel pipes laid underground or ensure speedy laying of steel pipes underground. But even in this method, an anticorrosion treatment of the uncoated portion in the pipe ends must be accomplished externally, and therefore the digging of a special excavation of a considerable width for such anticorrosion treatment is still required.

SUMMARY OF THE INVENTION

It is the object of the present invention to provide a method of joining coated large-diameter steel pipes laid underground, wherein in the laying of coated large-diameter steel pipes in the ground, the width of the required excavation is minimized and the need for digging a special excavation around the joining part of the pipes is eliminated, thus making it possible to accomplish early backfilling or backfilling of the excavation before the joining of the pipes by welding.

In accordance with the present invention, there is thus provided a method of joining coated large-diameter steel pipes laid underground by internally welding the groove of the pipes, the method comprising the steps of applying a layer of heat insulating material to the outer surface of the welding part of the pipes, covering the ends of the pipe coating, the uncoated portions in the pipe ends and the heat insulating layer with a layer of heat fusible, heat adhesive, corrosion resisting material (hereinafter called "coating material") of a shape corresponding to the external shape of the pipes, applying a thin clamp plate to the outer surface of this layer to make it fast, and then welding the groove internally, whereby the coating material and the ends of the pipe coating are thermally fused, thereby causing the thermally fused coating material to adhere to the uncoated portions of the pipes and unite with the ends of the pipe coatings.

DETAILED DESCRIPTION OF THE INVENTION

The method of this invention for joining coated large-diameter steel pipes laid underground will now be described with reference to the illustrated preferred embodiments.

Figure 1:
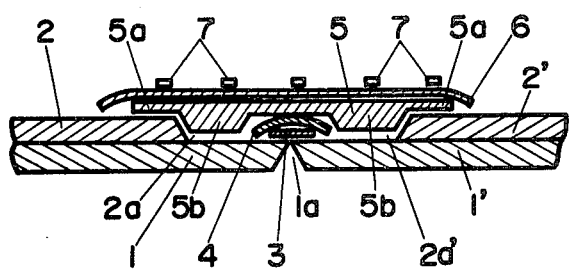
FIG. 1 is an upper longitudinal sectional view showing a preferred embodiment of the joining part of steel pipes according to the method of this invention.

Referring first to FIG. 1, numerals 1 and 1' designate coated large-diameter steel pipes to be joined. After the required excavation has been dug, the steel pipes 1 and 1' are arranged in the ground and are then aligned. If necessary, a tack welding is performed. Numeral 1a designates a groove formed for internally welding the steel pipes. Numerals 2 and 2' designate pipe coating, and the pipe coating 2 and 2' are not applied to the ends of the steel pipes 1 and 1'. The uncoated pipe ends are designated by numerals 2a and 2a'.

While the method of this invention is generally applicable to coated large-diameter steels pipes having the inside diameter of about 700 mm and greater so that the welder can enter into the pipes to perform welding operation, the method of this invention can of course be applied to the joining of small-diameter steel pipes which permit the use of automatic welding units. Such coated large-diameter steel pipes are of the type which have their outer surfaces coated with asphalt or synthetic resin material for corrosion resisting purposes, and such pipe coatings are not applied to the pipe ends, generally for the width of about 150 mm, for such joining operation as welding operation.

With the method of this invention, firstly the width of the uncoated portions of pipes to be joined is reduced to about ½ the width used with the conventional methods. While the width of such bare pipe portions has heretofore been selected to be about 150 mm so as to reduce the effects of welding heat, according to a first feature of the method of this invention the welding heat is utilized effectively and consequently the width of bare pipe portions is reduced as mentioned previously.

With the method of this invention, a heat insulating material 4 is applied to the outer surface of the pipes at the groove portion 1a. The purpose of the heat insulating material 4 is to control the transfer of welding heat to a layer of corrosion resisting material that will be described later, and it also serves as a welding backing. The heat insulating material 4 may be asbestos, glass fiber, mineral fiber or the like. If desired, as shown in the Figure, a backing strip 3 made of copper, steel or the like may be interposed between the grooved portion 1a and the heat insulating material 4.

In addition, the ends of pipe coating 2 and 2', the uncoated portions 2a and 2a' of the pipe ends and the heat insulating material 4 are covered with a layer 5 of heat fusible, heat adhesive, corrosion resisting material (coating material) of a shape corresponding to the external shape of the pipes. Since, in the joining part of the pipes 1 and 1', the uncoated portions 2a and 2a' are lower than the portions including the pipe coating 2 and 2' and the heat insulating layer 4, the layer 5 of coating material is formed with wing portions 5a which are placed on the pipe coating 2 and 2' and projections 5b which contact with the uncoated portions 2a and 2a'. The suitable materials for the heat fusible, heat adhesive, corrosion resisting material (coating material) 5 include, for example, asphalts, synthetic resine, etc. Such materials are solid or semisolid at room temperature but melt and become adhesive upon heating, and these materials are also corrosion resisting. The preferred example of such materials is asphalt material having such properties as a softening point of between 90 and 110° C according to the ASTMD-36 and a penetration of 5 to 40 at 20° C according to the ASTMD-5. If necessary, any filling materials including various clays, talc, asbestos powder, lime, etc., and/or any organic polymer such as polybutadiene or polybutylene may be admixed with the asphalt.

To facilitate the preparation and handling of the coating material layer 5, the coating material layer 5 may be advantageously prepared by using a cloth made from glass fiber, vinylon fiber or the like as a core material, applying or casting thermally fused coating material onto the core material to convert it to sheet form, cutting the sheet to the desired size, and then thermally fusing pieces of the desired size onto the cut length to provide projections 5b, thus ensuring easy preparation and handling.

Thereafter, the outer surface of the coating material layer 5 is bound by a thin clamp plate 6. Suitable materials for the thin clamp plate 6 include sheet steel, sheet rubber, plastics, glass mat, veneer board and the like.

Figure 3:
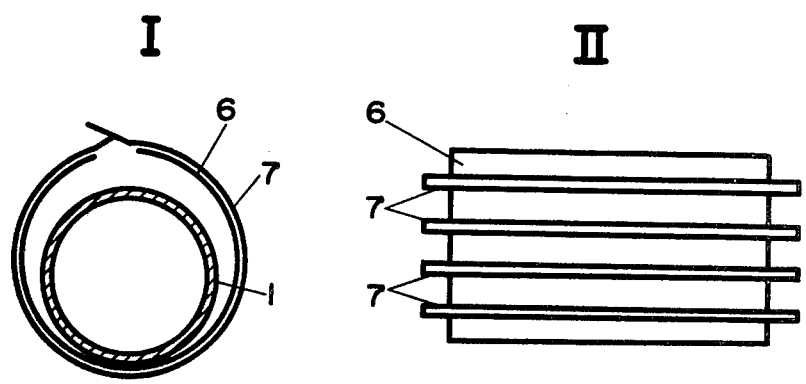
FIG. 3 shows exemplary forms of means for binding the clamp plate used with the method of this invention, (I) and (II) showing respectively a cross-sectional view and an expansion plan view of one form of the binding means, and (III) showing a cross-sectional view of another form of the binding means.
Figure 3:
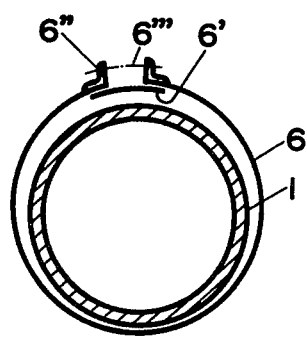

As regards the binding means for the thin clamp plate 6, the thin clamp plate 6 may be bound by a plurality of clamp hoops 7 as shown in FIGS. 3(I) and 3(II), or alternately, as shown in FIG. 3(III), a backing plate 6' may be placed inside the clamping portion of the thin clamp plate 6, and flanges 6" attached to the edges of the clamping portion of the thin clamp plate 6 may be made fast by means of a bolt and nut unit 6'''. In this preferred embodiment, the thin clamp plate 6 is made from a sheet steel and is provided with flanges at its clamping edges. The thin clamp plate 6 is placed around the outer surface of the coating material layer 5 with a steel backing strip being placed inside the thin clamp plate clamping portion and the flanges are then made fast by means of a bolt and nuts. In this way, the entry of water, soil, etc., to the joining part of the pipes is prevented.

With the method of this invention, after the outside of the pipe joining part has been prepared in the manner described above, the pipes are internally welded at the groove portion 1a. Consequently, the coating material layer 5 and the pipe coating ends 2 and 2' are fused by the welding heat over a certain distance on both sides of the groove, with the result that the heat fusible coating material is adhered and solified on the uncoated portions 2a and 2a' of the pipes, and a new corrosion resisting layer is formed on these portions and unite with the existing pipe coating 2 and 2'.

Figure 4:
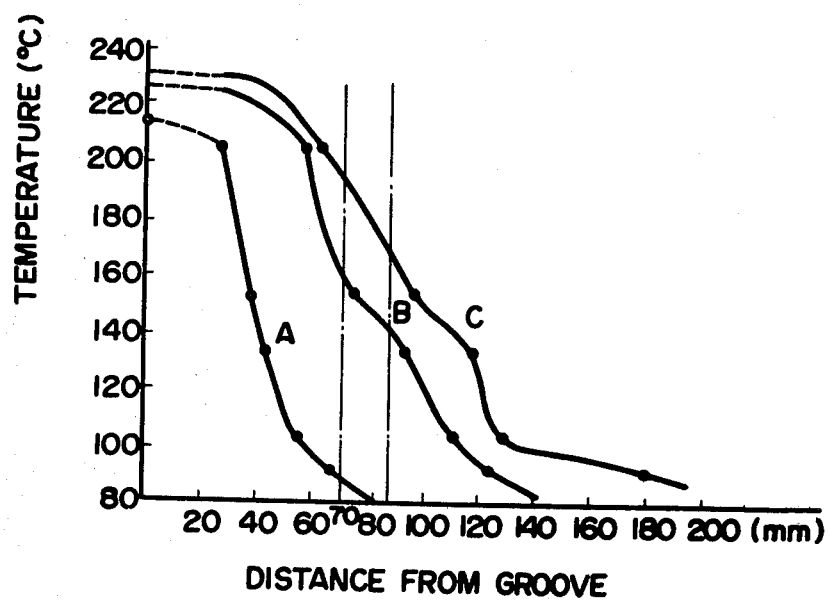
FIG. 4 is a graph showing the surface temperature distribution of asphalt coated steel pipes welded internally.

FIG. 4 shows the pipe surface temperature distribution obtained by internally welding steel pipes coated with asphalt of 1400A (the coating thickness is 7 mm and the width of the uncoated pipe ends is 70 mm). The graphs A, B and C respectively show the temperatures obtained upon completion of the welding of the first, second and third layers. Although the temperatures in the adjacent portions to the groove do not show the actually measured values, with the method of this invention, a heat insulating material is placed around this portion to adjust the temperature on the outside of the heat insulating material to become substantially as shown by the dotted lines. As will be seen from the Figure, upon completion of the welding of the second and third layers, the temperatures generally reached 150 to 180° C, the suitable temperatures for fusion bonding asphalts, even in those portions apart from the pipe ends by 90 mm.

Since the welding current is practically constant, by experimentally selecting the material, thickness, width, etc., of the heat insulating layer 4 as well as the material of the coating material, it is possible to obtain elevated temperatures which are suitable for fusion bonding the coating material layer 5 to the uncoated pipe portion 2a and 2a', while by properly adjusting the width of the uncoated portions 2a and 2a' of the pipes, it is possible to thermally fuse the coating material layer 5 along with the pipe coating ends 2 and 2' so as to be united therewith.

Figure 2:
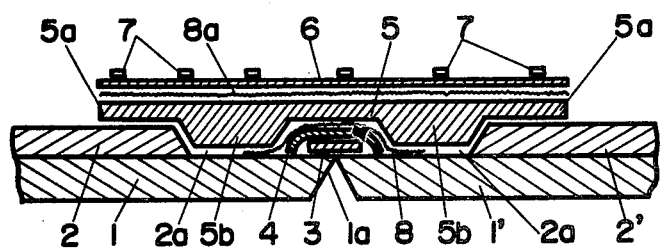
FIG. 2 is an upper longitudinal sectional view showing another preferred embodiment of the joining part of steel pipes according to the method of this invention.

With another preferred embodiment of the method of this invention, as shown in FIG. 2, sheets 8 and 8a for preventing leakage of thermally fused coating material are respectively placed between the heat insulating layer 4 and the coating material layer 5 and between the coating material layer 5 and the thin clamp plate 6. The suitable materials for the sheet 8 include heat shrinkable polyethylene, polyvinyl chloride, glass fiber and the like. The sheet 8 serves to prevent the fused coating material from entering into the groove 1a, and the sheet 8a is provided so that particularly when the coating material is heated excessively, the sheet 8a prevents the coating material from leaking to the outside. The sheets 8 and 8a should preferably be heat shrinkable synthetic resin sheets such as heat shrinkable polyethylene sheets or the like. Where a heat shrinkable synthetic resin sheet is used for the sheet 8, upon heating the sheet 8 shrinks and sticks to the pipes 1 and 1', thus more effectively preventing the entry of the thermally fused coating material into the groove. While the heat fusible coating material softens upon heating and thus it tends to enter into small gaps in the pipe joining part and loosen the binding, if a heat shrinkable synthetic resin sheet is used for the sheet 8a, there is the effect of causing the sheet 8a to shrink upon heating and bind the coating material layer. Further, since such synthetic resin sheet has corrosion resisting properties, its use can be expected to doubly ensure resistance to corrosion along with the coating material layer.

The method of this invention can be performed with ease by preliminarily integrally setting up as an assembly a heat insulating layer 4, a coating material layer 5 and a clamp plate 6, each having the desired width, thickness, length and shape, along with a sheet 8 or sheets 8 and 8a, as the case may be, inserting one end of the assembly into the excavation around the joining part of the steel pipes, placing the assembly further into the excavation and then making fast the ends of the assembly upwardly. The laying can be further simplified and the length of the time for laying can be reduced greatly by placing such assembly in the excavation near the joining end of a previously laid steel pipe, placing another steel pipe in the excavation, aligning and subjecting it to tack welding and the moving the assembly further along the joining part of the pipes and making fast the assembly.

With the method of this invention, the pipe joining operation can be performed satisfactorily within the ordinary excavation without the need to dig any special excavation for the joining operation, and moreover as soon as the mounting and binding of a heat insulating layer, coating material layer, thin clamp plate, etc., to the outer surface of the joining part of pipes are complete, the excavation can be immediately backfilled even before the completion of welding operation.

DESCRIPTION OF THE PREFERRED EMBODIMENTS

Steel pipes coated with asphalts of 800A, 900A, 1000A, 1100A, 1200A, 1300A, 1500A, 1600A, 1800A and 2000A (the coating thickness was 7 mm, and the width of the uncoated portion from the pipe ends was 70 mm) were joined by using the following materials set up in two assemblies.

(A) Assembly of heat insulating material and backing strip:
 (1) Heat insulating material: asbestos tape of 3 mm thick × 64 mm width.
 (2) Backing strip: flat steel of 4.5 mm thick × 32 mm width.

Figure 5:
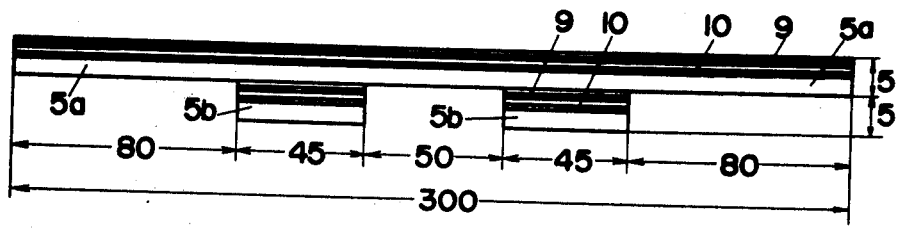
FIG. 5 is a cross-sectional view showing one form of the corrosion resisting layer.

(B) Assembly of thin clamp plate, outer leakage preventing sheet, coating material layer and inner leakage preventing sheet:
 (1) Thin clamp plate was prepared by bending the ends of galvanized sheet steel of 0.6 mm thick × 400 mm width and forming flanges by holding and welding the bent portions between equal angle steels of 3.2 × 50 mm and flat steels of 3.2 × 50 mm.
 (2) Outer leakage preventing sheet: heat shrinkable polyethylene sheet of 0.3 mm thick × 380 mm width.
 (3) Coating material layer was prepared by impregnating two core materials respectively consisting of vinylon cloth of 0.5 mm thick and glass mat made of synthetic resin impregnated glass fiber with blown asphalt having penetration of 30 and softening point of 90° C, laminating these impregnated materials into sheet of 5 mm thick, and then cutting, heat bonding and forming into a cross-sectional shape as shown in FIG. 5. In the Figure, numeral 9 designates the vinylon cloth, 10 the glass mat, and the sizes are in millimeter.
 (4) Inner leakage preventing sheet: heat shrinkable polyethylene sheet of 0.3 mm thick × 120 mm width.

Figure 6A:
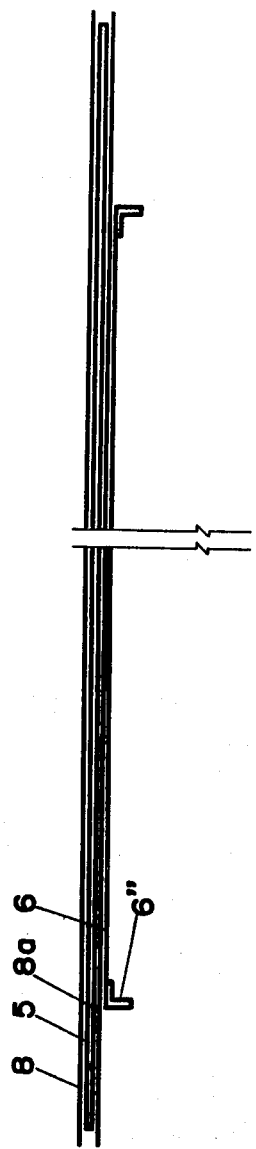
FIGS. 6A and 6B are respectively a sectional view and a plan view of an exemplary form of the joining assembly including the coating material layer, etc.
Figure 6B:
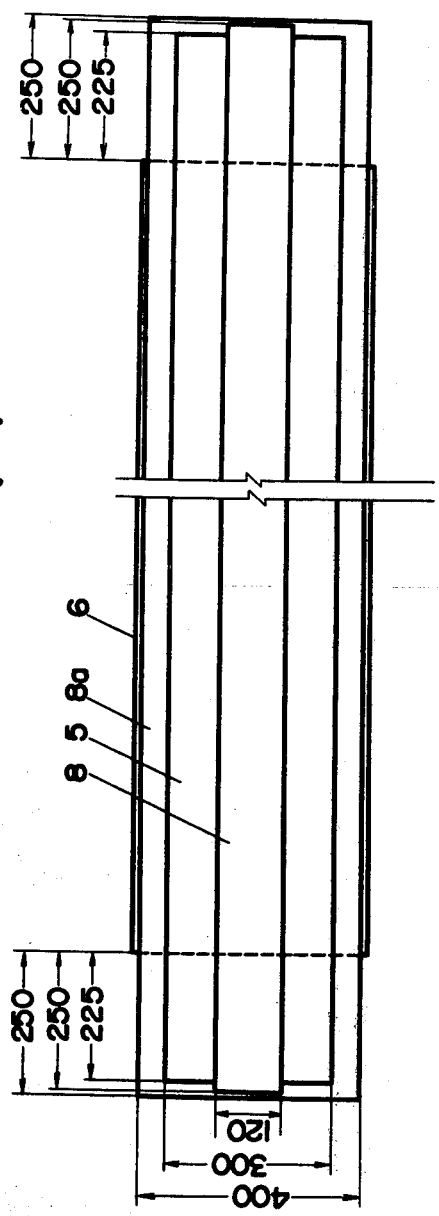

Assemblies A and B of the desired lengths corresponding to the diameter of steel pipes to be joined were mounted around the joining part of the steel pipes in this order. Of course, the steel pipes had been laid, aligned and subjected to tack welding in the excavation. FIGS. 6A and 6B show lengthwise sectional and plan views of the assembly B before its mounting. The sizes were in millimeter and the lengths were selected in accordance with the pipe diameter.

A backing plate consisting of a galvanized sheet steel of 0.6 × 400 × 600 mm was placed inside the thin clamp plate of the assembly B, and after the assembly B had been made fast by a separate auxiliary equipment the flanges were made fast by means of a bolt and nuts. After the flanges had been made fast, the excavation was immediately backfilled and the groove was welded.

The several joints of the steel pipes joined according to this embodiment were dug out immediately after the welding and 3 months later, respectively, and the coated materials were disassembled. The coating materials had been satisfactorily bonded to the steel pipes, and there was no trace of irregularities such as the entry of water, etc.

What is claimed is:

1. A method of joining coated large-diameter steel pipes laid underground by internally welding the groove of the steel pipes, said method comprising the steps of applying a layer of heat insulating material to an outer surface of the welding part of the pipes; covering the ends of pipe coating, uncoated portions of the pipe ends and the heat insulating layer with a layer of heat fusible, heat adhesive, corrosion resisting material of a shape corresponding to the external shape of the pipes; binding the outer surface of the corrosion resisting material layer with a thin clamp plate; and then welding the steel pipes thereby thermally fusing the corrosion resisting material layer and the ends of the pipe coating and causing the thermally fused corrosion resisting material to adhere to the uncoated portion on the pipes and unite with the ends of the pipe coating.

2. A method according to claim 1, wherein a leakage preventing sheet is placed between the heat insulating layer and the corrosion resisting layer to prevent leakage of the thermally fused corrosion resisting material.

3. A method according to claim 2, wherein a leakage preventing sheet is placed between the corrosion resisting material layer and the thin clamp plate to prevent leakage of the thermally fused corrosion resisting material.

4. A method according to claim 3, wherein the corrosion resisting material is asphalt.

5. A method according to claim 4, wherein the asphalt has a softening point of between 90 and 100° C, and a peneration of between 5 and 40 at 20° C.

6. A method according to claim 5, wherein the corrosion resisting layer includes a core material consisting of a cloth made from a fiber of the group consisting of glass and vinylon.

7. A method according to claim 6, wherein the thin clamp plate is a sheet of steel formed with a flange at each edge thereof, and having a backing plate inside a clamping portion thereof, said flanges being made fast by bolt and nut means.

8. A method according to claim 3, wherein the sheet for preventing leakage of the thermally fused corrosion resisting material is a heat shrinkable polyethylene sheet.

9. A method according to claim 3, wherein the corrosion resisting material is a mixture of asphalt, filing material and optionally an organic polymer.

10. A method of joining by welding in situ, coated large diameter steel pipe sections disposed underground, each of said pipe sections having grooves at respective ends thereof for forming a joint to permit joining said sections of said pipe; placing said pipe sections to be joined in end-to-end abutting relationship; said method including the steps of: disposing a heat insulating material layer across the joint of the pipe sections to be joined; placing a heat shrinkable sheet means above said insulating material layer, said sheet means forming an envelope about said material layer; disposing a heat fusible adhesive material above said sheet means extending to uncoated portions of said pipe, for adhering to said sheet means and uncoated portions of said pipe joint; laying another heat shrinkable sheet means at said joint, above said heat fusible adhesive material; placing a clamp plate about the outer periphery of said joint to form an envelope for containing said respective materials with respect to said joint and to fixedly position said materials; applying weldment internally of said pipe joint at said respective grooves formed at said abutting surfaces to thereby join said pipe sections and thusly applying heat transference to said materials in proximity to said joint for co-action therewith.

* * * * *